United States Patent [19]

Robinson

[11] 4,047,106
[45] Sept. 6, 1977

[54] MOTOR SPEED SENSOR

[76] Inventor: Charles Elbert Robinson, Livermore, Colo. 80536

[21] Appl. No.: 691,450

[22] Filed: June 1, 1976

[51] Int. Cl.² .................................................. G01P 3/36
[52] U.S. Cl. ..................................... 324/175; 324/166; 250/233
[58] Field of Search .............................. 324/175, 166; 250/231 BE, 233; 23/194 E

[56] References Cited

U.S. PATENT DOCUMENTS

| 3,729,996 | 5/1973 | Metz | 324/175 X |
| 3,866,120 | 2/1975 | Ford | 324/175 |
| 3,886,534 | 5/1975 | Swiden et al. | 324/175 X |
| 3,942,112 | 3/1976 | Westbrook | 324/175 X |

Primary Examiner—Rudolph V. Rolinec
Assistant Examiner—Vincent J. Sunderdick
Attorney, Agent, or Firm—Burton & Dorr

[57] ABSTRACT

A motor speed sensor for sensing the RPM speed of a motor is designed to be placed in line with a conventional mechanical tachometer take-off. The motor speed sensor includes rotatable shafts interconnecting the mechanical tachometer take-off so that the mechanical delivery to the tachometer is preserved and further includes a notched interrupter which rotates in cooperation with the interconnecting shafts. The notches of the interrupter are disposed to rotate between a photoelectric detector and a light source thereby interrupting the beam of light in order to provide a stream of output pulses whose frequency is directly proportional to the speed of the motor.

10 Claims, 8 Drawing Figures

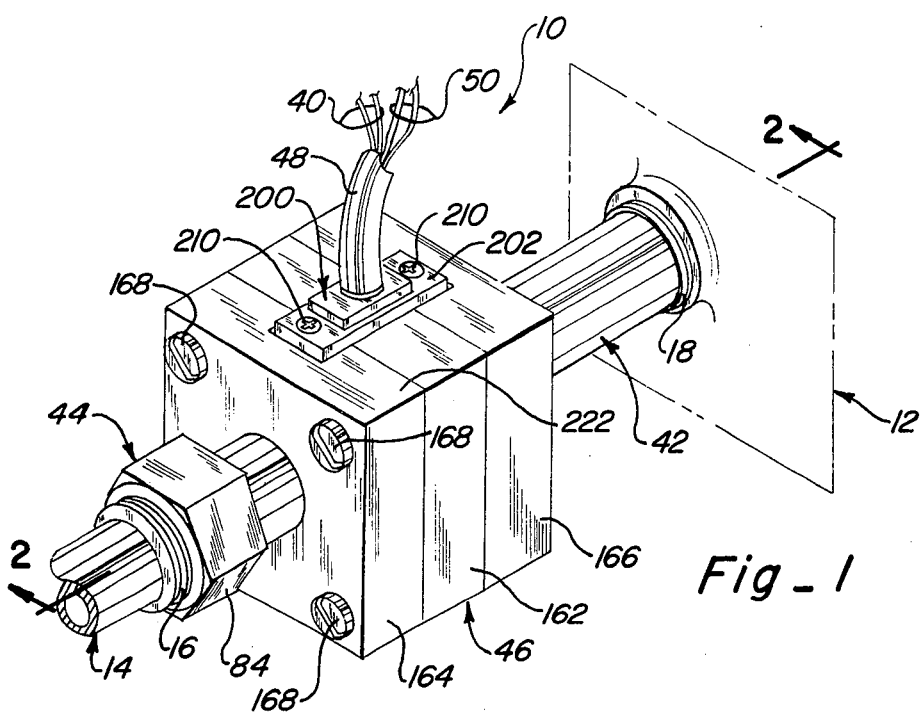
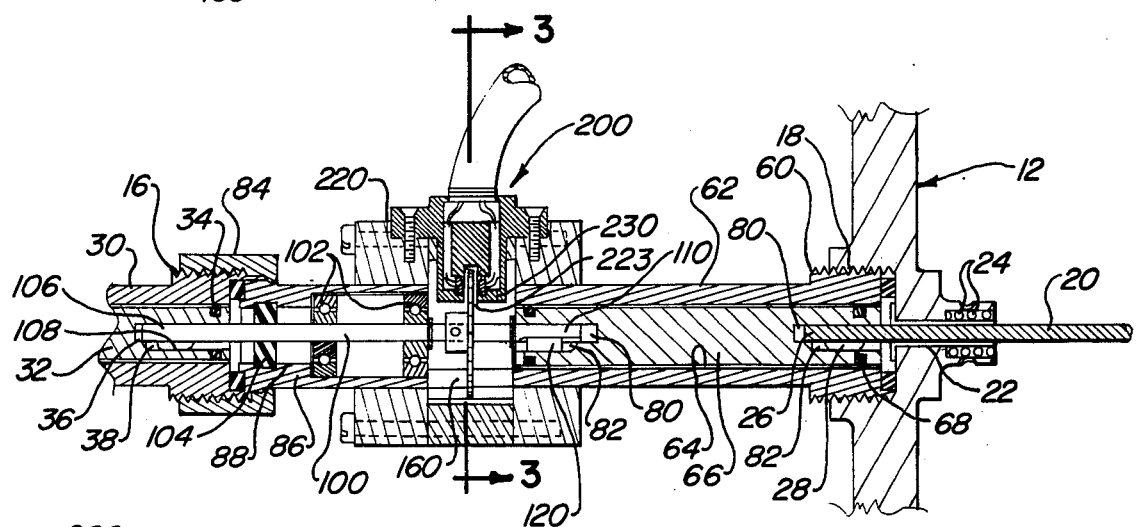
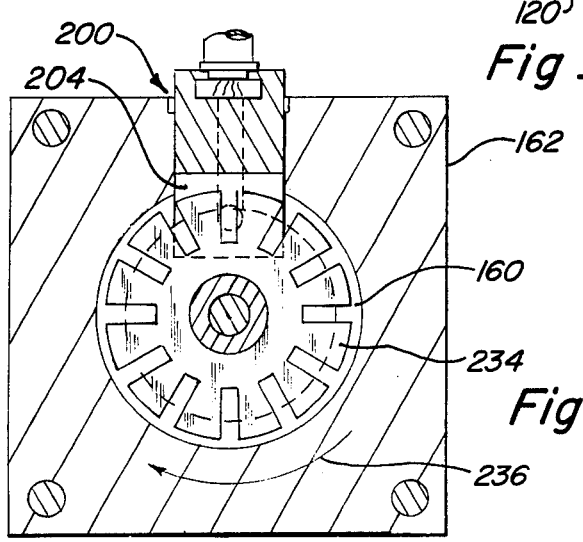
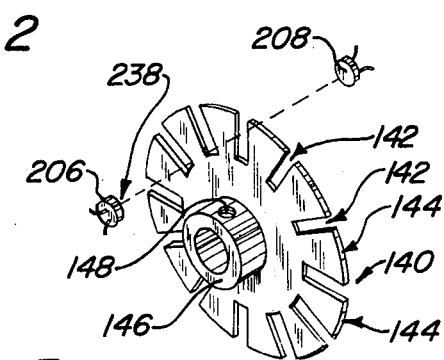

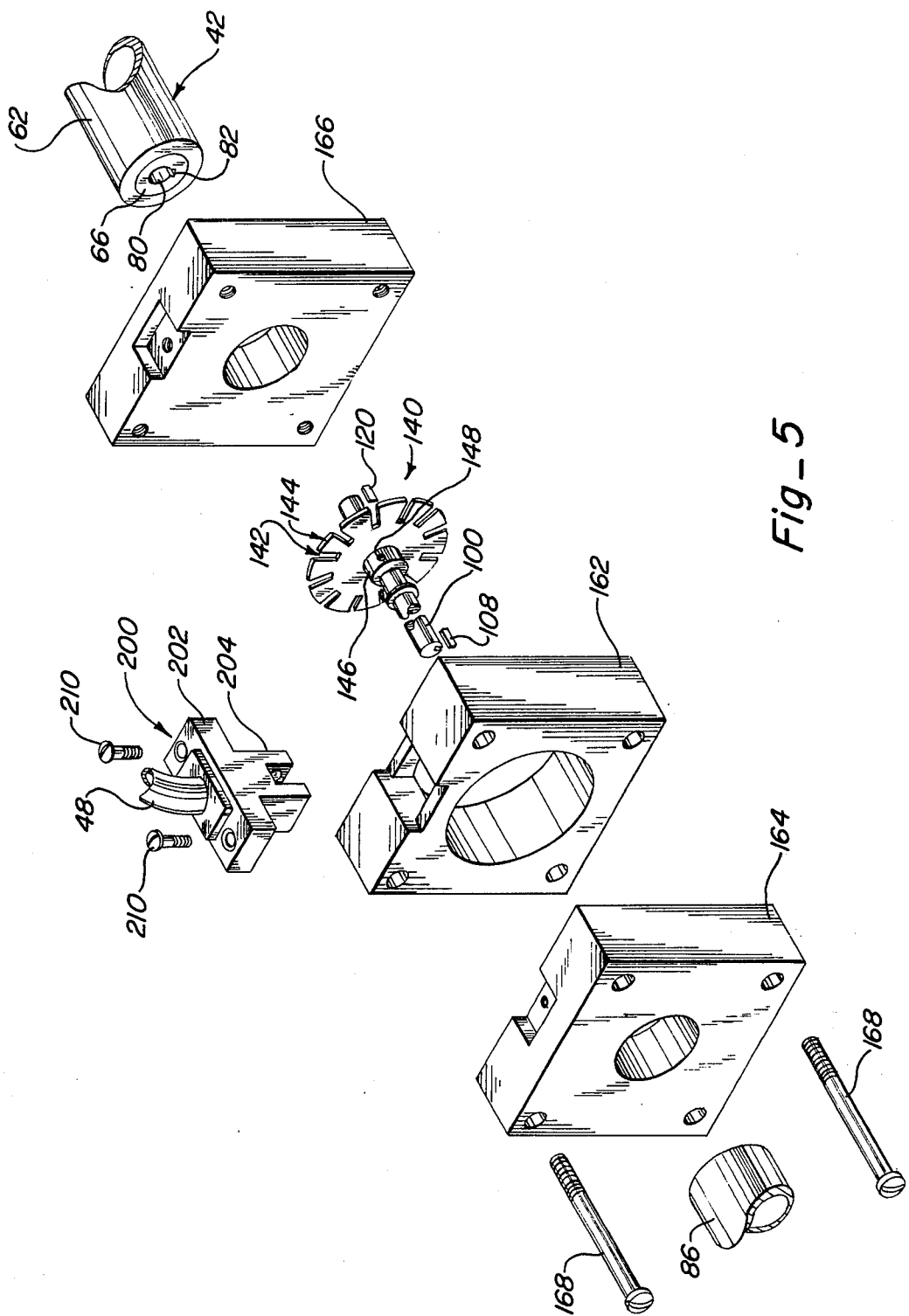
Fig_5

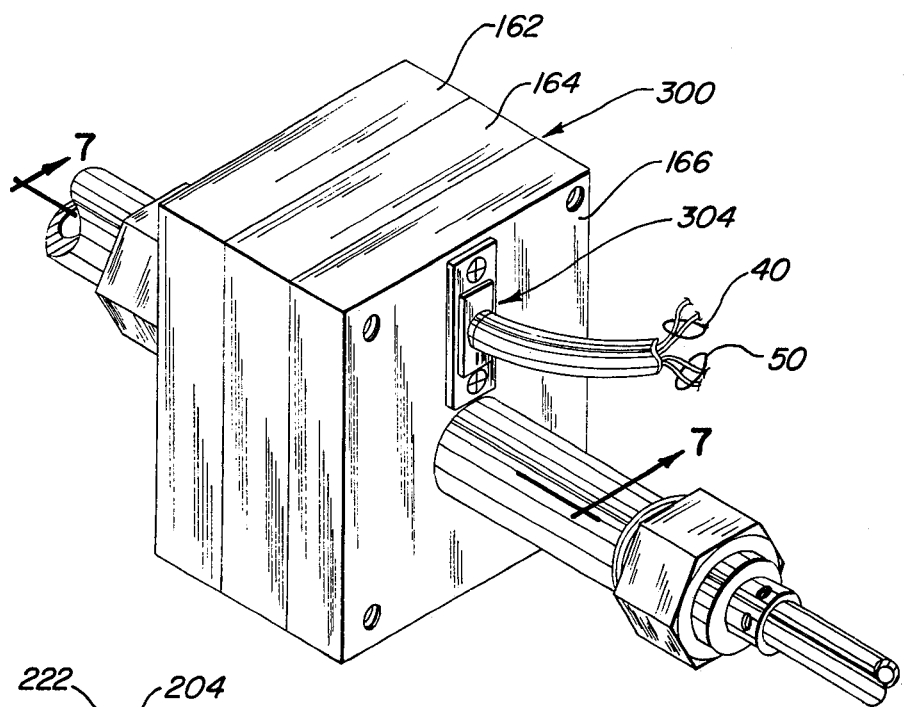
Fig.-6
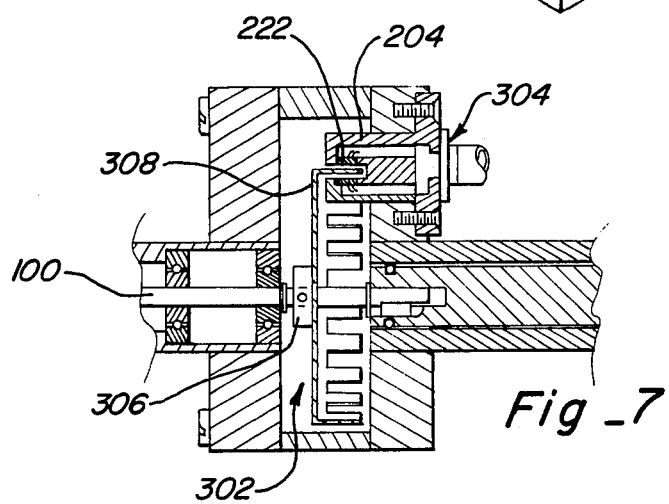
Fig_7
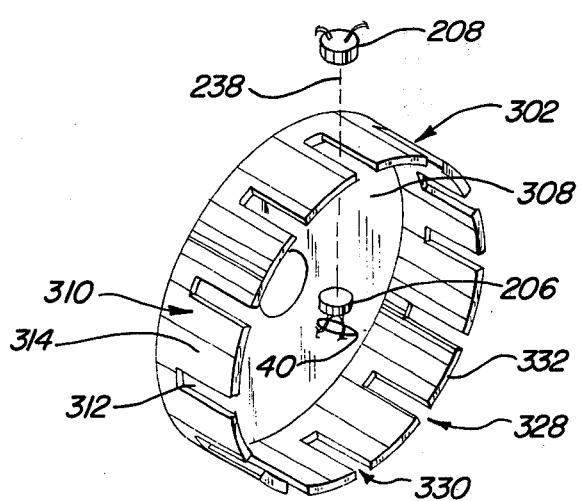
Fig_8

MOTOR SPEED SENSOR

BACKGROUND OF THE INVENTION

1. Field of the Invention

The present invention relates generally to devices for sensing the speed of a motor, and more particularly to devices for sensing motor speed that retrofit into existing mechanical tachometer systems.

2. Description of the Prior Art

Devices for sensing the speed of a motor have long been in use and encompass a variety of approaches for detection of the speed of the motor.

A popular prior art approach for sensing the speed of a motor is the mechanical arrangement in which a flexible drive shaft rotating in proportion to the speed of the motor is coupled to a gear and pinion to a linkage mechanism carrying a plurality of flyweights. The faster the drive shaft rotates the further the flyweights move outwardly from a center point due to the centrifugal force experienced. A sensor is connected to a display needle which moves the needle in response to the outward movement of the flyweights.

The following patented prior art approaches use a slotted disc for generating a digital signal corresponding to the speed of a rotating shaft or the like: Metz, U.S. Pat. No. 3,729,996 issued on May 1, 1973; Swiden, U.S. Pat. No. 3,886,354 issued on May 27, 1975; and Ford, U.S. Pat. No. 3,886,120 issued on Feb. 11, 1975. A similar arrangement to those set forth above is the U.S. Pat. No. 3,942,112 issued to Westbrook on Mar. 2, 1976 which also discloses a novel rotary seal.

Such prior art mechanical systems, however, are not accurate and are not instantaneous in response to variations in the motor's speed. In the prior art electronic control systems, highly accurate and rapid determinations of the speed of the motor are made. Such control systems require a series of electrical pulses whose frequency is proportional to speed of the motor. An example of an electronic control system is disclosed in copending application Ser. No. 691,724, entitled "Motor Brake Control System."

None of the above prior art approaches, however, provide an apparatus with an electronic output that is retrofittable into a conventional mechanical sensor attached to a motor while preserving the mechanical output as set forth in the above application.

OBJECTS OF THE INVENTION

It is therefore an object of this invention to provide a novel motor speed sensor retrofittable to a mechanical sensor system for detecting the speed of a motor wherein a series of pulses having a frequency proportional to the speed is generated.

It is still a further object of the present invention to provide a novel motor speed sensor retrofittable to a mechanical sensor system for detecting the speed of the motor wherein a light source provides a beam of light to a light detector and wherein an interrupter rotating with the speed of the motor interrupts the beam of light to produce a series of pulses the frequency of which is proportional to the speed of the motor.

It is still a further object of the present invention to provide a novel motor speed sensor retrofittable to a mechanical sensor system for detecting the speed of a motor wherein a beam of light to an electronic detector is interrupted by a circular disc coupled to a shaft which rotates with the speed of the motor to produce a series of electrical pulses the frequency of which is proportional to the speed of the motor.

It is still a further object of the present invention to provide a novel motor speed sensor retrofittable to a mechanical sensor system for detecting the speed of the motor wherein a beam of light is provided to an electronic detector and wherein a cylindrically shaped drum having notched circular sides rotates with a shaft that rotates with the speed of the motor to interrupt the beam of light thereby providing a series of output pulses at the detector and the frequency of which is proportional to the speed of the motor.

It is still a further object of the present invention to provide a novel motor speed sensor retrofittable to a mechanical sensor system for placement between a take-off from said motor and a flexible drive to a mechanical tachometer wherein a light beam directed to an electronic detector is interrupted by an interrupter that rotates with said take-off to provide a series of pulses at the output of the detector the frequency of which is proportional to the speed of the motor.

SUMMARY OF THE INVENTION

The motor speed sensor of the present invention is designed to retrofit into existing mechanical tachometer arrangements. The motor speed sensor of the present invention connects to the conventional fuel pump take-off for tachometers and extends the rotating signal at that point through the sensor to the conventional tachometer hookup. The sensor, however, has disposed therein a rotating interrupter which rotates and breaks a beam of light from a light source directed to a photocell. As the interrupter rotates in accordance with the speed of the motor, the beam of light is interrupted at a frequency proportional to the speed of the motor thereby producing a series of output pulses at the output of the detector whose frequency is also proportional to the speed of the motor.

The interrupter may comprise one of two preferred embodiments. In one embodiment, a circular disc having rectangular notches disposed inwardly from the circumference of the disc is coupled to a shaft that rotates with the speed of the motor. The light beam and detector are disposed in a horizontal plane at the midpoint of the notches so that as the disc rotates, the beam is positively interrupted to produce a series of electrical pulses at the output of the detector. In a second preferred embodiment, a cylindrically shaped drum having a closed end and an opposing open end is provided wherein at the center of the closed circular end is mounted to a shaft so that the drum rotates about the shaft and a plurality of rectangular shaped notches are provided extending from the open end along the sides. In this embodiment, the beam of light is directed vertically into the detector so that as the drum rotates, the light beam is interrupted.

Other objects, advantages and capabilities of the present invention will become more apparent as the description proceeds taken in conjunction with the accompanying drawings.

DESCRIPTION OF THE DRAWINGS

FIG. 1 is a perspective view of the preferred embodiment of a motor speed sensor constructed in accordance with the subject invention;

FIG. 2 is an elevational, cross-sectional view taken along line 2—2 of FIG. 1 and including parts of a fuel pump not shown in FIG. 1;

FIG. 3 is a cross-sectional view taken along line 3—3 of FIG. 2;

FIG. 4 is a perspective view of the preferred embodiment of a means for generating a series of pulses;

FIG. 5 is an exploded view, in perspective, of the motor speed sensor shown in FIG. 1, some parts having been omitted for purposes of clarity;

FIG. 6 is a perspective view of another embodiment of a motor speed sensor constructed in accordance with the subject invention;

FIG. 7 is an elevational view, in cross-section, taken along line 7—7 of FIG. 6; and FIG. 8 is another embodiment of a means for generating a series of pulses.

DETAILED DESCRIPTION

The motor speed sensor 10 of the present invention is shown in FIG. 1 interconnected between a conventional mechanical tachometer take-off on a fuel pump 12 and a conventional flexible drive cable 14. The threaded end 16 of the flexible drive 14 conventionally engages the threaded cavity 18 formed in the casing of the fuel pump 12. The motor speed sensor 10 of the present invention is designed to adapt to conventional mechanical tachometer systems with a minimum of difficulty as is shown in FIG. 1.

The conventional take-off formed in the casing of the fuel pump 12 includes a mechanically driven shaft 20 which rotates in proportion to the speed of the motor, not shown. The shaft 20 is disposed in a formed passageway 22 and is rotatably biased against a plurality of bearings 24 so that the shaft 20 freely moves without binding. In the threaded cavity 18 is an outwardly protruding extension 26 of the shaft containing a formed keyway 28. The purpose of the protruding extensing 26 with its accompanying keyway 28 is to provide a mechanical interlock with a correspondingly mating configuration.

Such a configuration is found formed in the conventional flexible drive 14 as shown in FIG. 2. Surrounding the drive 14 is a protective covering or sheet 30 usually made from metal or the like. Disposed in a passageway formed therein, is a flexible shaft 32 separated from the outer sheet 30 by a plurality of bearings 34. Formed in the end of the shaft 32 is a passageway 36 having a downwardly protruding keyway 38. The passageway 36 and keyway 38 are designed so that the outwardly protruding shaft 26 with its accompanying keyway 28 forms a press-fitor slideably engaging relationship therein. Therefore, in normal operation, the flexible drive 14 which is interconnected to the mechanical tachometer, not shown, has its threaded stud end 16 interconnected with the threaded cavity 18 of the casing of the fuel pump so that the extendable portion 26 of shaft 20 engages in a press-fit manner the formed passageway 36 and keyway 28. Therefore, as shaft 20 rotates in proportion to the speed of the motor, the flexible shaft 32 interconnected with a mechanical tachometer correspondingly rotates in proportion to the speed of the motor.

The motor speed sensor 10 of the present invention is designed to interconnect in the manner shown in FIG. 1 with the flexible drive 14 and the conventional fuel pump takeoff 18. The sensor 10 of the present invention, therefore, provides a plurality of output pulses over leads 40 which are representative of the speed of the motor while at the same time providing a mechanical output over flexible shaft 32 to the conventional mechanical tachometer. The sensor 10 of the present invention comprises a fuel pump linkage coupling portion 42, the flexible drive coupling portion 44, and the sensor portion 46. An electrical cable 48 is connected to the sensor portion 46 and carries the electrical pulses 40 representative of the speed of the motor and contains cables 50 for providing power to the sensing device disposed on the interior of the sensor portion 46.

The fuel pump linkage coupling portion 42 includes a threaded stud 60 which is capable of engaging the threaded internal cavity 18 of the casing of the fuel pump 12, a tube 62 having formed therein a passageway 64 in which is disposed a coupling shaft 66 separated from the interior surface of the passageway 64 by a plurality of bearings 68. The coupling shaft 66 freely rotates without binding in the formed passageway 64 on the bearing surfaces 68. Formed in each opposing end of the coupling shaft 66 is a passageway 80 and keyway 82. It is evident that when the fuel pump linkage portion 42 is interconnected with the fuel pump casing 12, the protruding portion 26 of shaft 20 engages the formed passageway 80 and the keyway 80 so that as the shaft 20 rotates with the motor, the coupling shaft 66 positively rotates therewith.

The flexible drive 44 and sensor 10 of the present invention will now be discussed. Linkage 44 includes a hexagonal shaped wrench pad nut 84 which is capable of engaging the linkage 44 to the flexible drive cable 14 by threadedly engaging the stud portion 16 of the cable 14. The linkage 44 further includes a tube 86 having formed therein a passageway 88 and having disposed in the passageway a coupling rod 100. The coupling rod 100 is separated from the passageway 88 by bearing surfaces 102. Additionally, a felt washer 104 is provided which press-fittingly engages between the passageway 88 and the outer surface of the rod 100 to prevent dust or the like from traveling inwardly to the interior of the sensor 10. The rod 100 has a protruding portion 106 which press-fittingly engages the formed passageway 36 and has a key 108 which pressfits or slidably engages keyway 38. When the tube 86 is threadedly engaged with the flexible drive 14, any rotation of coupling rod 100 causes a corresponding positive rotation of the mechanical shaft 32 in the cable 14.

The opposing end of rod 100 also has formed thereon a protruding portion 110 having a downwardly extending key 120. The protruding portion 110 with key 120 press-fittingly engages the formed passageway 80 and keyway 82 of coupling shaft 66 as shown in FIG. 2. It is evident that as the take-off shaft 20 disposed in the fuel pump conventionally rotates with the speed of the motor, coupling shaft 66 correspondingly rotates driving coupling rod 100 to positively rotate the flexible drive 32. One skilled in the art can readily appreciate that due to the high speeds involved, that positive coupling is required at each of the three areas shown in FIG. 2 and that the tolerances of the mating surfaces are sufficiently tight to provide such positive coupling.

One embodiment of the sensor 10 of the present invention will now be described. Disposed around the coupling rod 100 is a notched disc 140 as shown in FIG. 4. The notched disc has a plurality of formed notches 142 and a plurality of solid interrupters 144. Disposed on one surface of the disc 140 is a coupling hub 146 having a conventional allen socket 148 containing an allen screw for tightly coupling the disc 140 to rod 100. It is to be expressly understood that any of a number of conventional approaches can be used to attach disc 140 to coupling rod 100 including the use of notched or flat keyways. As shown in FIGS. 2 and 3, the notched disc 140 is disposed in a cylindrically shaped chamber 160. Chamber 160 is pre-formed in section 162 of the sensor portion 46. Section 162 is sandwiched between portions 164 and 166 which are correspondingly shaped substantially square sections of similar thickness. These portions 162, 164, and 166 are interconnected by means of screws 168 in a conventional fashion. Section 164 is attached to the flexible drive coupling portion 86 of coupling section 44 while section 166 is firmly attached to the take-off coupling section 42. It is evident that the notched disc 140 freely rotates about the coupling rod 100 as the shaft 20 turns and that the rotation of the notched disc 140 freely occurs within the cylindrically shaped cavity 160.

Also disposed in the cylindrically shaped cavity 160 is a photo detector assembly 200. The photo detector assembly 200 includes an external mounting block 202 to which the cable 48 is attached, downwardly protruding prongs 204 and a conventional detector 206 with a corresponding light source 208. The mounting block 202 is designed to attach by means of screws 210 into a similarly shaped recess 220 on the upper surface 222 of the sensor portion 46. Projecting downwardly from and integral with the mounting block portion 202, is the pronged or forked section 204 which defines a mouth 223 through which the edge of the notched disc 140 freely rotates. Disposed in opposing fashion in each opposing prong 230 is a photo cell 206 and the light source 208.

In FIGS. 6, 7, and 8 is shown a second preferred embodiment of the motor speed sensor of the present invention. This embodiment 300 is identical to the above described embodiment 10 but for the provision of a cylindrically shaped notched drum 302 and a side mounted photo detector assembly 304.

The cylindrically shaped drum 302 is mounted to the coupling rod 100 by means of a hub 306 which is integral with the closed end 308 of the drum 302. The end 328 of the cylinder 302 opposing the circular closed end 308 is open. Formed in the sides 310 of the cylinder 302 are a plurality of rectangular-shaped notches 312. Each of the formed notches 312 are substantially rectangular in shape having one end 330 open and co-planar with the circumference 332 of the open end. The notches 312 are separated by interrupter portions 314.

As shown in FIG. 7, the photo detector assembly 304 is mounted on the side of section 166 so that the mouth 223 defined between the pronged or forked section 204 is oriented so that as the drum freely rotates with rotating rod 100, the interrupter sections 314 and the formed notches 312 rotate in a fashion so that the beam of light 238 is positioned substantially in the mid-section of the rectangular region of the notch 312 in a manner shown in FIG. 8.

In operation, it is evident that as the coupling rod 100 rotates in the previously described manner, the beam of light 238 from light source 208 directed toward light detector 206 is continually interrupted by interrupters 314. A series of pulses whose frequency varies with the speed of rotation of the motor is generated at the output 40 of the detector 206. The interruption operation occurs in the same fashion for notched disc 10 wherein notches 144 break or interrupt the horizontally direct beam of light 238.

It is further evident that regardless of which preferred embodiment of notched interrupter is used, that the number of interrupters and the number of notches in each embodiment may be varied to adapt to any particular type of application. For example, the following table illustrates examples of such variations:

| No. of Notches | Degrees Break to Break | Motor Sensitivity | Pulses Per Second at 1000 RPM | Pulses Per Second at 4000 RPM |
|---|---|---|---|---|
| 12 | 30 | 1/6 Rev. | 100 | 400 |
| 24 | 15 | 1/12 Rev. | 200 | 800 |
| 36 | 10 | 1/18 Rev. | 300 | 1200 |

Although the present invention has been described with a certain degree of particularlity, it is understood that the present disclosure has been made by way of example and that changes in detail of the structure may be made without departing from the spirit thereof.

I claim:

1. A motor speed sensor for placement between a take-off from said motor and a flexible drive for a tachometer, said take-off providing rotation proportional to the speed of said motor, said sensor comprising:
    means connected to said take-off for extending the rotation of said take-off to said flexible drive,
    a light source for providing a beam of light,
    means operative with the rotation of said extending means for interrupting the beam of light at a rate that is proportional to said speed of said motor, and
    means receptive of said interrupted beam for generating a series of pulses, the frequency of said pulses being proportional to said speed.

2. The sensor of claim 1 in which said interrupting means comprises a circular disc coupled to said extending means and having a plurality of formed notches disposed circumferentially away from the center of said disc.

3. The sensor of claim 1 in which said interrupting means comprising a cylindrically shaped drum having a circular closed end and circular open end with a plurality of notches formed around the cylindrical sides, said circular closed end being coupled to said shaft at the center of said closed end.

4. The sensor of claim 1 in which said extending means comprises:
    a shaft,
    means connected to said shaft for coupling one end of said shaft to said take-off,
    a rod,
    means connected to said rod for coupling one end of said rod to, the end of said shaft opposing the end of said shaft connected to said take-off,
    means connected to the end of said rod opposing said end coupled to said shaft for coupling to said flexible drive, said interrupting means being connected to said rod.

5. The sensor of claim 1 in which said generating means is a photo detector.

6. A motor speed sensor for placement between a take-off from said motor and a flexible mechanical drive for a tachometer, said take-off providing rotation proportional to the speed of said motor, said sensor comprising:
    a shaft, said shaft by having one end coupled to said take-off being capable of rotating in sync with said take-off,
    a rod, said rod by having one end coupled to the remaining end of said shaft being capable of rotating in sync with said shaft, means connected to the remaining end of said rod for coupling to said flexible drive, a light source for providing a beam of light, means operative with the rotation of said rod for interrupting the beam of light at a rate that is proportional to said speed of said motor, and means receptive of said interrupted beam for generating a series of pulses, the frequency of said pulses being proportional to said speed.

7. The motor speed sensor of claim 6 further comprising means enclosing said shaft and said rod, said enclosing means being capable of preventing dust from around said shaft and said rod.

8. The motor speed sensor of claim 7 in which said flexible drive has formed at said end coupled to said rod a passageway having a downwardly protruding keyway and said rod at said end coupled to said drive having a diameter substantially corresponding to the diameter of said drive passageway and further having a key protruding downwardly to mate with said drive keyway, said rod being supported in enclosing means by means of a washer disposed near said coupling of said rod to said flexible drive.

9. The motor speed sensor of claim 7 in which said enclosing means comrpises a first plurality of bearing surfaces operative upon said rod for rigidly supporting said rod in alignment with said shaft and a second plurality of bearing surfaces operative upon said shaft for rigidly supporting said shaft in alignment with said rod and with said take-off.

10. A motor speed sensor for placement between a take-off from said motor and a flexible mechanical drive for a tachometer, said take-off providing rotation proportional to the speed of said motor, said sensor comprising:

a shaft, said shaft by having one end coupled to said take-off being capable of rotating in sync with said take-off, a rod, said rod having one end coupled to the remaining end of said shaft being capable of rotating in sync with said shaft, means connected to the remaining end of said rod for coupling to said flexible drive, a light source for providing a beam of light, means operative with the rotation of said rod for interrupting the beam of light at a rate that is proportional to said speed of said motor, means receptive of said interrupted beam for generating a series of pulses, the frequency of said pulses being proportional to said speed, means enclosing said shaft and said rod, said enclosing means being capable of preventing dust from around said shaft and said rod, said flexible drive having formed at said end coupled to said rod a passageway having a downwardly protruding keyway and said rod at said end coupled to said drive having a diameter substantially corresponding to the diameter of said drive passageway and further having a key protruding downwardly to mate with said drive keyway, said rod being supported in enclosing means by means of a washer disposed near said coupling of said rod to said flexible drive, and said enclosing means comprising a first plurality of bearing surfaces operative upon said rod for rigidly supporting said rod in alignment with said shaft and a second plurality of bearing surfaces operative upon said shaft for rigidly supporting said shaft in alignment with said rod and with said take-off.

* * * * *